United States Patent Office 3,043,665
Patented July 10, 1962

3,043,665
PURIFICATION OF BORON TRICHLORIDE
Jack R. Gould, Morristown, and David M. Gardner, Dover, N.J., assignors, by mesne assignments, to Thiokol Chemical Corporation, a corporation of Delaware
No Drawing. Filed Sept. 6, 1955, Ser. No. 532,748
3 Claims. (Cl. 23—205)

This invention relates to an improved process for the purification of boron trichloride. More particularly, it relates to the removal of phosgene and chlorine from boron trichloride.

Boron trichloride ($BCl_3$) is a gas at ordinary temperatures, having a boiling point of about 18° C. It can be prepared by passing chlorine over mixtures of boron oxide and carbon heated to elevated temperatures approximating 1000 to 1200° C. The chloridizing reaction results in the formation of a boron trichloride and a relatively large volume of carbon monoxide in accordance with the equation:

$$B_2O_3 + 3C + 3Cl_2 = 2BCl_3 + 3CO$$

This reaction is exceedingly difficult to control and the effluent gases usually contain free chlorine and phosgene as well as boron trichloride and carbon monoxide. On condensing this mixture of gases at temperatures approximating —10° C., the boron trichloride and the phosgene, which have closely similar boiling points, collect in the liquid phase and this liquid phase has a relatively high solubility for the free chlorine present in the gas mixture. The dissolved chlorine and phosgene are not readily removed by selective vaporization. The crude product is useful for some purposes, but for many uses, the chlorine and phosgene interfere. Thus it is necessary to provide a method for the purification of crude boron trichloride, particularly with respect to chlorine and phosgene.

The process of the present invention comprises passing gaseous boron trichloride contaminated with phosgene and/or chlorine in contact with molten zinc at temperatures of about 420 to 600° C. A temperature of about 500 to 550° C. appears to be sufficient to remove substantially all of the chlorine and phosgene contaminants without danger of undue decomposition. The zinc is suitably melted, for example, in a pot and the gas to be purified is passed in contact with the surface of the metal or passed beneath the surface of the metal.

Under these conditions substantially no boron trichloride is decomposed. The exit gas, however, contains more volatile contaminants. The purified boron trichloride is advantageously recovered by condensing it to a liquid, conveniently at —80° C., and removing the more volatile contaminants by pumping until the vapor pressure of the liquid corresponds to that of pure boron trichloride. This is 3.3 mm. at —80° C.

It is an advantage of the process of the present invention that the method is effective for the purification of commercial quantities of boron trichloride. The starting materials and condition of operation allow easy handling of materials and simple design of apparatus. The zinc is readily available at low cost.

*Example 1*

Technical grade boron trichloride containing 2.8 mole per cent of phosgene and small proportions of chlorine was passed at a pressure of about 700 mm. of mercury at a rate of about 10 ml. of gas per second through a bent tube having an inside diameter of 20 mm. and a length of 30 cm. containing a pool of molten zinc maintained at a temperature of 500–550° C. The exit gas was cooled to —80° C. and collected as a liquid. Dissolved gases were removed by reducing the pressure on the liquid at this temperature and allowing it to come to equilibrium. The process was repeated until the vapor pressure corresponded to 3.3 mm. at —80° C. An infrared spectrum of the liquid after purification showed the absence of bands due to phosgene and chlorine.

We claim:
1. A method for the treatment of impure boron trichloride containing at least one of the materials chlorine and phosgene as impurities to provide a boron trichloride product containing readily separable more volatile contaminants which comprises contacting the impure boron trichloride in vapor phase with molten zinc at a temperature of about 420° to 600° C. and recovering a gaseous boron trichloride product containing readily separable more volatile contaminants.
2. The process of claim 1 wherein the impure boron trichloride and molten zinc are contacted at a temperature within the range from 500° C. to 550° C.
3. In the process of claim 1, the step of condensing the boron trichloride product containing readily separable more volatile components, and vaporizing the more volatile components to provide a purified boron trichloride liquid product.

References Cited in the file of this patent
UNITED STATES PATENTS

| 2,097,482 | Weber | Nov. 2, 1937 |
| 2,369,214 | Cooper | Feb. 13, 1945 |